United States Patent
Hachisuka et al.

[11] Patent Number: 5,882,382
[45] Date of Patent: *Mar. 16, 1999

[54] POLYIMIDE SEMIPERMEABLE MEMBRANE

[75] Inventors: Hisao Hachisuka; Kenichi Ikeda, both of Osaka, Japan

[73] Assignee: Nitto Denko Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 738,299

[22] Filed: Oct. 25, 1996

[30] Foreign Application Priority Data

Oct. 31, 1995 [JP] Japan .................................. 7-308405

[51] Int. Cl.⁶ ........................... B01D 53/22; B01D 71/64
[52] U.S. Cl. .................................. 96/13; 96/14; 210/500.39
[58] Field of Search ................ 96/4, 11–14; 210/500.39; 55/524

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/233 |
| 4,230,463 | 10/1980 | Henis et al. | 55/16 |
| 4,277,344 | 7/1981 | Cadotte | 210/654 |
| 4,673,418 | 6/1987 | Peinemann | 96/12 X |
| 4,705,540 | 11/1987 | Hayes | 55/16 |
| 4,717,393 | 1/1988 | Hayes | 96/4 X |
| 4,717,394 | 1/1988 | Hayes | 96/4 X |
| 4,784,880 | 11/1988 | Coplan et al. | 96/12 X |

(List continued on next page.)

FOREIGN PATENT DOCUMENTS

| | | | |
|---|---|---|---|
| 59-062305 | 4/1984 | Japan | 96/12 |
| 61-133106 | 6/1986 | Japan | 96/14 |
| 4-40223 | 2/1992 | Japan . | |
| 5-49882 | 3/1993 | Japan . | |
| 5-146651 | 6/1993 | Japan . | |
| 5-184887 | 7/1993 | Japan . | |

OTHER PUBLICATIONS

Chern, et al., "Preparation of Composite Membranes via Interfacial Polyfunctional Condensation for Gas Separation Applications", *Journal of Applied Polymer Science*, vol. 44, 1992, pp. 1087–1093.

Chung, et al., "Development of a defect–free 6FDA–durene asymmetric hollow fiber and its composite follow fibers", *Journal of Membrane Science*, vol. 88, 1994, pp. 21–36.

Fritzsche, et al., "Polysulfone Hollow Fiber Membranes Spun from Aliphatic Acid ($C_2$–$C_4$): N–Methylpyrrolidone Complexes–Structure Determination by Oxygen Plasma Ablation", *Journal of Applied Polymer Science*, vol. 41, 1990, pp. 713–733.

*Primary Examiner*—Robert Spitzer
*Attorney, Agent, or Firm*—Merchant, Gould, Smith, Edell, Welter & Schmidt

[57] ABSTRACT

A polyimide resin semipermeable membrane has a continuous structure of a homogeneous skin layer part having an average thickness of 5–1000 nm and a porous layer that is made of the same materials and has the same thickness as the skin layer. The porous layer is formed by the void structure having the average hole diameter of less than 3 μm so that a gas separation membrane can be provided, having high permeability and satisfying cost efficiency requirements can be provided. The above-mentioned membrane is formed by the following steps: a solution is made by adding diethylene glycol dimethyl ether into polyimide; the obtained solution is left for deaeration and adjusted; the film-forming solution is cast on a polyester nonwoven cloth, which serves as a supporting layer, with an applicator; the solution is soaked in water as a solidifying solution for 5 minutes and in a water. Thus semipermeable membrane comprising the homogeneous skin layer part and the porous layer. Crosslinking silicone resin solution may be formed on the surface of the above-mentioned semipermeable membrane to form the overcoat.

8 Claims, 9 Drawing Sheets

U.S. PATENT DOCUMENTS

| | | | |
|---|---|---|---|
| 4,838,900 | 6/1989 | Hayes | 96/4 X |
| 4,857,080 | 8/1989 | Baker et al. | 96/12 X |
| 4,880,441 | 11/1989 | Kesting et al. | 55/16 |
| 4,902,422 | 2/1990 | Pinnau et al. | 210/500.23 |
| 4,929,405 | 5/1990 | Kohn | 264/41 |
| 4,948,400 | 8/1990 | Yamada et al. | 96/14 X |
| 4,954,144 | 9/1990 | Burgoyne, Jr. et al. | 96/14 X |
| 4,983,191 | 1/1991 | Ekiner et al. | 210/500.39 X |
| 4,990,255 | 2/1991 | Blume et al. | 96/13 X |
| 5,055,116 | 10/1991 | Kohn et al. | 96/14 X |
| 5,061,298 | 10/1991 | Burgoyne, Jr. et al. | 96/14 X |
| 5,067,970 | 11/1991 | Wang et al. | 210/500.39 X |
| 5,071,452 | 12/1991 | Avrillon et al. | 96/14 X |
| 5,076,816 | 12/1991 | Avrillon et al. | 96/14 X |
| 5,085,676 | 2/1992 | Ekiner et al. | 55/158 |
| 5,085,776 | 2/1992 | Blume et al. | 96/13 X |
| 5,112,941 | 5/1992 | Kasai et al. | 96/14 X |
| 5,160,353 | 11/1992 | Gochanour | 96/13 X |
| 5,163,977 | 11/1992 | Jensvold et al. | 96/14 X |
| 5,165,963 | 11/1992 | Matsumoto et al. | 427/245 |
| 5,178,940 | 1/1993 | Matsumoto et al. | 96/14 X |
| 5,266,100 | 11/1993 | Simmons | 96/14 X |
| 5,286,539 | 2/1994 | Kusuki et al. | 96/13 X |
| 5,320,650 | 6/1994 | Simmons | 96/14 |
| 5,322,549 | 6/1994 | Hayes | 96/4 X |
| 5,443,728 | 8/1995 | Macheras et al. | 210/500.39 X |
| 5,558,936 | 9/1996 | Chung et al. | 210/500.39 X |
| 5,599,380 | 2/1997 | Koros | 96/4 X |
| 5,605,627 | 2/1997 | Carlsen et al. | 210/500.39 X |
| 5,635,067 | 6/1997 | Macheras | 210/500.39 X |
| 5,647,894 | 7/1997 | Ohara et al. | 96/14 X |
| 5,749,943 | 5/1998 | Shimazu et al. | 96/14 X |

| | |
|---|---|
| Maximum Value | 253.0 |
| Minimum Value | 198.0 |
| Average | 238.389156 |
| Distribution | 176.774472 |
| Deviation | 13.2956561 |
| First-section bottom value | 0.0 |
| Final-section top value | 256.0 |
| Gradation | 256 |
| Scale of vertical axis | 1 |

| | |
|---|---|
| Maximum Value | 245.0 |
| Minimum Value | 22.0 |
| Average | 130.888111 |
| Distribution | 4475.52128 |
| Deviation | 66.8993369 |
| First-section bottom value | 0.0 |
| Final-section top value | 256.0 |
| Gradation | 256 |
| Scale of vertical axis | 1 |

| | |
|---|---|
| Maximum Value | 246.0 |
| Minimum Value | 1.0 |
| Average | 170.295348 |
| Distribution | 4879.22672 |
| Deviation | 69.8514618 |
| First-section bottom value | 0.0 |
| Final-section top value | 256.0 |
| Gradation | 256 |
| Scale of vertical axis | 1 |

| | |
|---|---|
| Maximum Value | 242.0 |
| Minimum Value | 4.0 |
| Average | 131.620930 |
| Distribution | 6827.30514 |
| Deviation | 82.6275083 |
| First-section bottom value | 0.0 |
| Final-section top value | 256.0 |
| Gradation | 256 |
| Scale of vertical axis | 1 |

POLYIMIDE SEMIPERMEABLE MEMBRANE

FIELD OF THE INVENTION

This invention relates to a polyimide semipermeable membrane having a specific membrane structure and a method for manufacturing the same in a wet phase-transversion method where a specified solvent is used. More specifically, this invention relates to a gas separation membrane, in particular, a polyimide semipermeable membrane that is used for separating and concentrating such specified components as hydrogen, methane, carbon dioxide, oxygen, nitrogen, water vapor, acid gas or the like, from a mixed gas for industrial use or for water treating and relates to a method for manufacturing the same.

BACKGROUND OF THE INVENTION

In the field of the reverse osmosis membrane, thin membranes have been examined on an industrial level. For example, as an asymmetric membrane, the Lobe membrane made of cellulose acetate is disclosed in U.S. Pat. No. 3,133,132 and U.S. Pat. No. 3,133,137. The surface skin layer of this membrane has a semipermeability, however it does not have a high separation property for smaller molecules such as gas molecules. On the other hand, as a composite membrane, a polyamide thin membrane formed on the porous supporting membrane by the interfacial polymerization method is disclosed in U.S. Pat. No. 4,277,344. The surface skin layer of this type of membrane has also a semipermeability, however it does not have a separation property for smaller molecules such as gas molecules, either.

Recently reducing the thickness of the macromolecule materials such as for separating gas molecule has been investigated. This is conducted taking into consideration providing asymmetric membranes and composite membranes having a practical mechanical strength.

In the case where a macromolecule material having a high separation factor is formed as a membrane on a proper porous supporting film, it is preferable that the membrane should have no defects and the thickness of the membrane should be not more than 100 nm so as to increase a gas permeating speed practically. U.S. Pat. No. 4,929,405 discloses that the thickness of a homogeneous fluorine-containing aromatic polyimide membrane is controlled to be smaller than the required limitation of not more than 100 nm or not more than 400 angstrom(A) in a water facial expansion method. However, it is impossible to manufacture membranes having the above-mentioned thickness on an industrial level. Various methods have been also disclosed in, for example, Japanese Laid Open Patent No. Tokkai-Hei 4-40223 and U.S. Pat. No. 4,230,463, in which a polymer solution is coated onto the proper porous supporting film and then dried to form a thin film. When such an ultra thin film without having pin-holes is manufactured on an industrial level, the manufacturing process becomes complicated, the yield deteriorates and the cost is raised. Moreover, the ultra thin film has a void structure with large hole diameters and cannot be manufactured on an industrial level. The application of the interfacial polymerization method also has been investigated (See, for example, J. Appl. Polym. Sci., 44 (1992)1087–1093). However, a sufficient permeability and separation property cannot be obtained. In addition, a membrane of the skin layer and that of the porous supporting film are not made of the same materials, thus causing detaching from each other at the interface and also deteriorating the strength of the membrane.

An asymmetric membrane has been investigated in various ways. Tai-Chung et al. reported in J. Memb. Sci., 88 (1994)21–36 discloses a hollow fiber membrane having a no-defects skin layer of 200–300 nm level. But a pinhole-free skin layer having a thickness of not more than 100 nm that satisfies the required limitation cannot be manufactured on an industrial level. Moreover, the method for manufacturing the asymmetric membrane is disclosed in U.S. Pat. No. 4,705,540 in which the asymmetric membrane is formed by drying the surface of a membrane and then soaking it in water. But this method has not come into practice. In other words, this method remains as a laboratory level method for forming membrane. Thus, it is difficult to provide membranes stably on an industrial level by this method. U.S. Pat. No. 4,880,441 and J. Appl. Polym. Sci., 41 (1990)713–733 etc disclose an asymmetric membrane (hollow fiber membrane) having skin layers which gradually become dense, but these membranes are also insufficient in the thickness as well as the method for industrial use. Moreover, these asymmetric membrane have a relatively dense porous layer located under the skin layer. There arises a problem such that as the permeability of the skin layer increases, the permeation resistance of the porous layer increases. In order to obtain a pinhole-free asymmetric membrane, Japanese Laid Open Patent Nos. Tokkai-Hei 5-049882 and Tokkai-Hei 5-146651 disclose the post-treatment method and Japanese Laid Open Patent No. Tokkai-Hei 5-184887 disclose the pre-treatment method. Moreover, U.S. Pat. Nos. 4,902,422, 5,085,676 and 5,165,963 disclose the improvement in the manufacturing process.

However, the above-mentioned methods have problems as follows: the manufacturing process is increased and becomes complicated; the manufacturing cost is raised; and it is difficult to stably manufacture membranes on an industrial level. If the semipermeable membrane is required to be manufactured for the practical use and on an industrial level and separated sufficiently, the above-mentioned methods of the prior art cannot provide the semipermeable membrane with the satisfactory structure. More specifically, first, in the case of a composite membrane, thin film is formed in the porous supporting film so that the strength of the interface is not sufficient. Additionally, the holes on the porous supporting film are filled in order to obtain a no-defect membrane so that the thickness of the membrane is required to be greater. Secondly, in the case of an asymmetric membrane, the skin layer and the porous layer are formed together so that they are not detached from each other on the interface. In other words, in this case, the strength of the membrane is sufficient. However, it is impossible to manufacture a skin layer having a thickness of not less than 100 nm and no deficiency on an industrial level. The structure is characterized in that the hole diameters are made to be gradually larger from the skin layer part to the porous part. Consequently, near the skin layer and the porous part, when the quantity of permeation is great, the permeation resistance is also great. As a result, sufficient permeability and separation properties cannot be provided.

SUMMARY OF THE INVENTION

The object of the present invention is to solve the above mentioned problems. The semipermeable membrane of the present invention comprises the skin layer of the homogeneous membrane having a thickness below the predetermined value and the porous layer which is made of the same materials so that it has a sufficient strength. Moreover, in the semipermeable membrane of the present invention, the interface between the skin layer and the porous layer is clear and further the hole diameter of the porous part does not gradually increase. Consequently, the semipermeable membrane of the present invention has the sufficient opening ratio, which is large enough that the permeation resistance does not increase even when the quantity of permeation becomes large.

In order to obtain the above-mentioned objects, the polyimide semipermeable membrane is a polyimide resin semipermeable membrane forming a continuous structure comprising a homogeneous skin layer part having an average thickness of 5–1000 nm and a porous layer that is made of the same material as the skin layer and is thicker than the skin layer. The above-mentioned porous layer having the void structure with an average hole diameter of not more than 3 $\mu$m is not the so-called finger void structure (the structure having the cylindrical shaped voids in the thickness direction) but the fine air gap (=void) structure.

It is preferable in the above-mentioned structure that the polyimide semipermeable membrane has the void structure in the porous skin layer part having the thickness of L2 that is L1×10, where L1 represents the thickness of the homogeneous skin layer part, and at least 70% of the porous skin layer is an open part and a rectangle circumscribing a pore of the open part has dimension of Ly and Lx (Lx and Ly are in the following ranges: 10 nm$\leq$Lx$\leq$1000 nm and 10 nm$\leq$Ly$\leq$1000 nm). More specifically, it is preferable that the hole diameter in the air gaps (voids) is less than 1 $\mu$m, more preferably not more than 100 nm.

It is preferable in the above-mentioned structure that the skin layer part of the polyimide semipermeable membrane has an average brightness of not less than 100 and a standard deviation of not more than 50 at a 256 gradation, when a skin layer part having a thickness of L1 is observed by means of the scanning electron microscope having field emission electron gun (FE-SEM) at ×50,000 magnification and pictured as a binary picture at a monochrome 256 gradation. The average brightness is not less than 100 and the standard deviation is not more than 50, which signifies that the skin layer part is homogeneous and there are few or no defects parts (i.e. pin-holes) Thus, the preferable semipermeable membrane structure can be provided.

It is preferable in the above-mentioned structure that the hole part of the porous layer of the polyimide semipermeable membrane obtained by the picture analysis which is conducted under the condition below the average boundary value or threshold value at a 256 gradation accounts for not less than 40% with respect to the whole pictured part, when the porous layer part having the thickness of L2 that is L1×10 (where L1 represents the thickness of the homogeneous skin layer part) is observed by means of the FE-SEM at ×50,000 magnification and pictured as a binary picture at a monochrome 256 gradation. As stated above, if the hole part of the porous layer accounts for not less than 40%, even if the quantity of permeation of the skin layer part is large, the permeation resistance is small, meaning that the preferable semipermeable structure can be provided.

It is preferable in the above-mentioned structure that the average brightness ratio of L1 to L2 (=brightness L1/brightness L2) of the polyimide semipermeable membrane is not less than 1.5 at a 256 gradation when the skin layer part having the thickness of L1 and the porous layer part having the thickness of L2 that is L1×10 is observed by means of the FE-SEM at ×50,000 magnification and pictured as a binary picture at a monochrome 256 gradation. As stated above, the average brightness ratio of L1 to L2 (=brightness L1/brightness L2) being not less than 1.5 signifies that the semipermeable membrane of the present invention has a clear structure of the skin layer part and the porous layer part and provides the preferable semipermeable membrane.

It is preferable in the above-mentioned structure that the elastomer polymer overcoat is formed on the skin layer of the polyimide semipermeable membrane from the perspective that the membrane can be protected by preventing pin-holes from generating.

It is preferable in the above-mentioned structure that the elastomer polymer overcoat comprises a crosslinking silicone resin that is crosslinked.

The method for manufacturing the semipermeable membrane of the present invention provides the skin layer of the homogeneous membranes having a thickness below a predetermined value and the porous layer which is made of the same materials, thus providing the sufficient strength. Moreover, according to the semipermeable membrane of the present invention, the interface between the skin layer and porous layer is clear and further the diameter of holes in the porous part does not gradually increase and even when the quantity of permeation becomes large, the permeation resistance does not increase.

The above-mentioned semipermeable membrane of the present invention forms a continuous structure comprising the homogeneous skin layer part having an average thickness of 5–1000 nm and the porous layer that is made of the same materials as the skin layer. As shown in a cross section, the semipermeable membrane does not have a finger void structure having the hole diameter of not less than 3 $\mu$m in its porous layer. Moreover, as shown in FIG. 1, in the cross section, the void structure of the porous skin layer part can be observed. The pores of the porous layer, which has the thickness of L2 that is L1×10 where L1 represents the thickness of the homogeneous skin layer part, and 70% of the above-mentioned porous skin layer is an open part, are sized so that a rectangle circumscribing a pore of the open part has dimension of Ly (10 nm$\leq$Ly$\leq$1000 nm) in length and Lx (10 nm$\leq$Lx$\leq$1000 nm) in width. And the hole diameters are not increased gradually. In order to observe and determine the structure of an ultra thin skin layer part, the scanning electron microscope (SEM) is used, in particular, the FE-SEM or scanning electron having the field emission (FE) electron gun or atomic force microscope are preferably employed. In order to determine the structure of membranes by means of the above mentioned devices, the optimum observation magnification should be selected in accordance with the purposes. The finger void structure of the porous layer having a thickness of not less than 3 $\mu$m can be observed at the magnification of ×500 or more. However, the skin layer part and the porous part are preferably observed at the magnification of ×20,000 or more, by means of the FE-SEM at the low accelerating current (preferably 1–3 KV) so that the exact and clear picture can be obtained and analyzed. Handling of samples is conducted by the well-known method.

In order to recognize the characteristic of the structure of the semipermeable membrane obtained by the present invention, the method of taking the FE-SEM picture into a computer and analyzing the picture is preferably employed. The picture analysis can be conducted by means of any of the commercially available software. In analyzing the picture, for example, the contrast, focus and halation of the FE-SEM picture, which are entered into a computer, will influence the digitization of the picture.

In order to inhibit the randomness of the contrast, focus and halation or the like, an automated device for the SEM is preferably employed.

It is preferable in analyzing the FE-SEM picture that the magnification of the SEM picture is not less than ×20,000, more preferably ×50,000, so as to obtain the exact and clear SEM picture. The method for taking the obtained SEM picture into the computer is not particularly limited. It is preferable that the obtained SEM picture is directly taken from the FE-SEM screen or the FE-SEM picture is taken by means of the scanner.

The obtained picture is made as a binary picture at a monochrome 256 deviation and processed. Referring to FIG. 2, the method for numerically evaluating the structure of the semipermeable membrane of the present invention will be illustrated as one embodiment.

[skin layer part]

A cross section of the semipermeable membrane is observed at ×50,000 magnification by means of the FE-SEM and made as a binary picture at a monochrome 256 gradation. The skin layer part is observed on the FE-SEM picture. Then, the thicknesses of at least ten places optionally selected from the above-mentioned skin layer part, preferably selected from W1, the part of 500–1500 nm in length in the skin layer, are measured so as to determine L1 as an average value. On the picture, the part represented by L1×W1 is designated and the histogram of the brightness is made. Then the average brightness and standard deviation are calculated. In the case where the skin layer part exists clearly and there are few or no deficiencies, the standard deviation of the brightness becomes small. In the preferable semipermeable membrane, the average brightness of the skin layer is not less than 100 and the standardized deviation is not more than 50 at a 256 gradation.

On the other hand, if the average value of the brightness is less than 100 and the standard deviation is more than 50, the skin layer part is not homogeneous. In this case, the obtained semipermeable membrane has many defects (holes) therein, and thus a desirable semipermeable membrane cannot be provided.

[porous layer part]

When the thickness of the above-mentioned homogeneous skin layer part is made to be L1, the thickness of the porous layer part is L2. L2 herein is defined by L1×10. A cross section of the porous layer part is observed by means of the FE-SEM at ×50,000 magnification and pictured at a 256 gradation as a binary picture. The average brightness of the pictured part is nominated as the boundary value (threshold value). The part having the brightness greater than the average value is drawn as a non-hole part. For what ratio the drawn part (non-hole part) accounts with respect to the entire place (M1) (%) is calculated by means of a computer. The ratio of the other parts is decided to be the open ratio (the ratio of the part occupied by the holes), which is represented by (1−M1) (%). In the case where the open ratio is large, even if the quantity of the permeation is large, the permeation resistance does not easily increase. Consequently, the open ratio is preferred to be not less than 40%. If the open ratio under the skin layer is less than 40%, in the case where the quantity of the permeation is large, the permeation resistance is large. Thus, excellent permeable membrane cannot be provided.

[skin layer part and porous layer part]

The ratio of the average brightness (=brightness (L1)/brightness (L2)) is calculated from each average brightness of the above-mentioned skin layer part (L1) and the porous layer part (L2). As the ratio of the average brightness decreases, the holes of the porous layer are gradually becoming small to form the skin layer part. In the case where the semipermeable membrane has the clear structure of skin layer part and porous layer part, the ratio of the average brightness is preferably 1.5 or more.

The method for manufacturing the semipermeable membrane comprising the above-mentioned structure includes the following steps: a solution comprising membrane materials and organic solvent(A) having a dielectric constant of not more than 30 and dipole moment of not more than 3.0 D or a solution comprising the organic solvent (C) having, as a main component, the organic solvent comprising at least one ether linkage in its molecular structure unit, for example the organic solvent including diethylene glycol dimethyl ether in an amount of 60–100 wt. %, is prepared; the above-mentioned solutions are extruded in a tubular shape or hollow fiber shape or properly coated onto the support base; and the above-mentioned solution is contacted with the solvent (B) which does not dissolve the above-mentioned membrane materials but is miscible for the above-mentioned organic solvent (A) or organic solvent (C).

The membrane material employed for the present invention is not limited, and any of the materials that can be dissolved into the above-mentioned organic solvent (A) or organic solvent (C). For example, polyimide expressed in the following Chemical Formula (1) is preferably employed.

Chemical Formula (1)

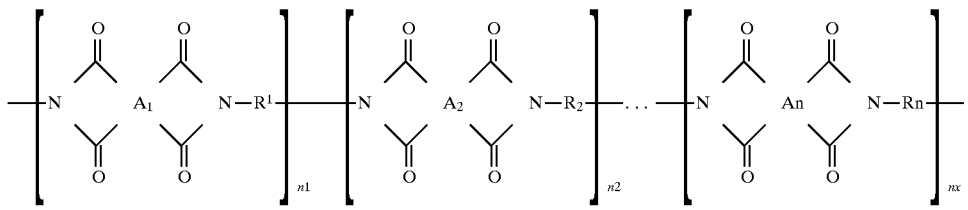

where $A_1$–$A_n$ represent quadrivalent organic groups selected from the group consisting of aromatic, alicyclic and aliphatic hydrocarbon groups, $R_1$–$R_n$ represent divalent aromatic, alicyclic or aliphatic hydrocarbon group or a divalent group where the hydrogen groups are bonded by the above-mentioned divalent organic groups; at least one organic group of $A_1$–$A_n$ and/or $R_1$–$R_n$ is an organic group having at least three fluorine atoms. As an organic group which has not less than three fluorine atoms at least one of which is present in $A_1$–$A_n$, a —$CF_3$ group is employed. For example, a quadrivalent group expressed in the following Chemical Formula (2) is preferably employed.

Chemical Formula (2)

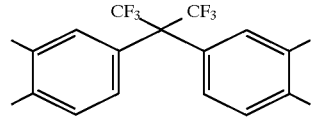

A serious problem is not caused if amic acid is partially maintained in all of the imide ring parts of the above-mentioned formula (2), as long as the ratio is 30% or less. That is, the imide reacting rate should be not less than 70%. This ratio is calculated by comparing the number of the remaining —COOH groups to the whole imide ring parts by the use of $^1$H-NMR. When the ratio is over 30%, the lipophilicity between the organic solvent (A) or the solvent (C) and solvent (B) is raised due to the increase of —COOH. As a result, pin holes are formed and the separation ability of the fluorine-containing polyimide gas separation membrane is deteriorated.

The fluorine-containing polyimide resins can be used alone or as a mixed solvent comprising two solvents or more. Furthermore, it can be a copolymer or a mixture with polymers like polyimide, kinds of cellulose and polyethylene glycol or the like, other than a fluorine-containing polyimide resin. The percentage of the components, however, does not exceed 50 mol %.

The organic solvent (A) has a dielectric constant of not more than 30 and a dipole moment of not more than 3.0 D. More preferably the dielectric constant is not more than 10. Since the polarity of the organic solvent (A) is small, the lipophilicity with the solvent (B) used as a solidifying solution is weak. Therefore, when both solutions are in contact with each other, an interface is temporarily formed at their boundary surface. Consequently, the doping solution is leached into the solvent as a solidifying solution and a homogeneous skin layer is formed by the wet phase transversion film-forming at the interface. Thus film-forming on an industrial level is realized while pin holes are not formed in a wide range of the homogeneous skin layer.

Although the organic solvent (A) is not limited, as long as the above-mentioned condition is satisfied, diethylene glycol dimethyl ether (the dielectric constant is 5.97 and the dipole moment is 1.97 D) is preferably employed. In addition, 1,2-dimethoxyethane (the dielectric constant is 5.50 and the dipole moment is 1.79 D) is also taken as a preferable example. These solvents can be used alone or as a mixed solvent comprising two solvents or more. An aprotic solvent having a dielectric constant of over 30 and/or a dipole moment of over 3.0 D can be added to adjust the solubility of the fluorine-containing polyimide and the viscosity of the dope. The above-mentioned aprotic solvent should be 30 weight % (wt. %) or less. When the above-mentioned aprotic solvent is added, an organic solvent including diethylene glycol dimethyl ether in an amount of 60–100 wt. % is preferably used as the organic solvent (A) in the present invention. For instance, a mixture containing diethylene glycol dimethyl ether in an amount of 67 wt. % and N-methyl pyrrolidone (NMP) in an amount of 33 wt. % is taken as an example.

When a conventional aprotic polar solvent is used as a doping solvent, the dielectric constant is not less than 32 and the dipole moment is not less than 3.7 D. In other words, the lipophilicity with the solidifying solvent (e.g. water) is strong. The above-mentioned aprotic polar solvents include N-methyl-2-pyrrolidone (the dielectric constant is 320 at the temperature of 25° C. and the dipole moment is 4.00 D at the temperature of 30° C.); N,N-dimethyl acetamide (the dielectric constant is 37.8 at the temperature of 25° C. and the dipole moment is 3.72 D); N, N-dimethyl formamide (the dielectric constant is 36.7 at the temperature of 25° C. and the dipole moment is 3.86 D at the temperature of 25° C.); and dimethyl sulfoxide (the dielectric constant is 48.9 at the temperature of 20° C. and the dipole moment is 4.30 D). When the above-mentioned solvent and solidifying solvent are in contact with each other, the interface is not generated due to the strong lipophilicity between the solvent and solidifying solvent. Consequently, the doping solvent leaches into the solidifying solvent faster than the skin layer formed during the wet phase transversion film-forming method. As a result, pin holes are generated in the wide range of the homogeneous skin layer. If this conventional aprotic polar solvent is used for the wet phase transversion film-forming method, a dope for film-forming is cast or spun in a permeable supporting film, and then left for a predetermined time at a predetermined temperature to partially evaporate the solvent. In this case, however, since the lipophilicity of the above-mentioned aprotic polar solvent with water is too strong, it absorbs the moisture in the air. Thus, the surface becomes turbid and more pin-holes are formed.

An organic solvent (C) of the present invention should include mainly an organic solvent which has at least one ether bond in the molecular unit. As such examples, RO—$(CH_2CH_2$—O—$CH_2CH_2)_n$OR' (where n represents 2–5 and R,R' represent alkyl group having C1–6) is preferabley used. More preferably, diethylene glycol dimethyl ether; diethylene glycol diethyl ether; and diethylene glycol dibuthyl ether are used. Moreover, RO—$(CH_2CH_2$—O$)_n$OR' (where n represents 2–5 and R,R' represent alkyl group having $C_{1-6}$) is also preferably used. More preferably, triethylene glycol diethyl ether; 1,2-dimethoxyethane; 1,2-diethoxyethane; and 1,2-dibutoxyethane are employed. These materials can be used alone or as a mixture of plural kinds of solvent. Aprotic solvent having no ether bonding group in its molecular unit can be added in order to adjust the solubility of the fluorine-containing polyimide and the viscosity of the dope. The amount of the aprotic solvent added herein should be not more than 30 wt. %. These solvents have the same characteristics as the above-mentioned organic solvent (A) with respect to the solidifying solvent (B).

The wet phase transversion film-forming method using the above-mentioned dope will be explained below. Although the film-forming method and the shape of the film are not limited in the present invention, the asymmetric membrane becomes tubular (including hollow fiber) or flat, by soaking the dope of the organic solvent (A) or (C) in the solidifying solvent (B) by the extrusion method or the casting method.

A flat membrane is obtained in the following steps of coating the dope onto the porous support by casting or dipping method; and dipping the dope in the solidifying solvent (B) so that a semipermeable membrane is obtained in a composite form. Therefore, the mechanical strength of the semipermeable membrane of the present invention is improved. A glass plate having an even surface or porous supports can be used for the support for the present invention. The porous supports include an organic, inorganic or metallic porous materials, woven cloth, nonwoven cloth and the like. The thickness of the dope on the porous support is from 25 to 400 $\mu$m, or more preferably, from 30 to 200 $\mu$m.

The dope where the organic solvent (A) of this invention is used is formed at the temperature from −80° to 80° C., more preferably at the temperature from −20° to 40° C.

The solidifying solvent (B) is used to remove the organic solvent (A). The solvent (B) is not limited as long as it is miscible with the solvent (A) while not dissolving the fluorine-containing polyimide resin. However, water, alcohols like methanol, ethanol, and isopropyl alcohol, or a mixture thereof can be used. Among them, water is preferably used. Although the temperature of the solidifying solvent (B) is not particulary limited, the soaking and removal is preferably conducted at the temperature ranging from 0° to 50° C.

A gas separation membrane is formed where the thickness of the homogeneous skin layer is constant and not more than 1000 angstrom by forming an asymmetric film in the above-mentioned condition. The thickness of the skin layer is substantially homogeneous and pin-holes which deteriorate the separation ability are not generated over a large area.

It is further preferable that the semipermeable membrane of this invention has a skin layer of the semipermeable membrane coated with elastomer polymer. In the case where the defects (pin-holes) are generated on the surface of the skin layer by laminating the thin films of the elastomer polymer, the pin holes on the surface are filled and the surface is hardly scratched. The elastomer polymer is a kind of polymer that can form flexible films, which includes ethylene monomer, homopolymer or copolymer of conjugated diene monomer. The examples include polypropylene, poly (vinylchloride), ethylene-propylene copolymer, ethylene-propylene-diene copolymer, polybutadiene, polyisoprene, chloroprene rubber, poly (4-methyl-penten-1), butadiene-styrene copolymer, isoprene-isobutylene copolymer, or polyisobutylene or the like. In addition to the monomers, copolymers containing monomer components having functional groups like acrylonitrile, methacrylate, methacrylic acid, or copolymers having both of the soft and hard segments are also included. The example of the latter copolymers include polyether polyol, polyurethane polyether, polyurethane polyester, and polyamide polyether. Some other materials that are cured by a curing agent having straight and long chains are also used as the elastomer polymers. The examples are epoxy resin, ethyl cellulose, and butoxy resin. A crosslinked silicone resin is especially preferred as the elastomer polymer in this invention. Such a crosslinked silicone resin is soluble in organic solvents before it is crosslinked. However, it is not dissolved in organic solvents after crosslinking. Such a silicone resin can be manufactured in a manner disclosed in Japanese Laid Open Patent No. Tokkai-Sho 59-225705.

The form of the element using the semipermeable membrane is not limited. It will be a hollow element when it is extruded to be a tubular shape. When it is coated on a proper support, it can be modulized as a spiral, flat, or tubular shaped element.

DETAILED DESCRIPTION OF THE DRAWING

Referring now to specific embodiments, the present invention is not limited to these embodiments.

EXAMPLE 1

A fluorine-containing polyimide comprising a repeating unit expressed as the following Chemical Formula (3) was synthesized in the following method using the solvent of diethylene glycol dimethyl ether.

Chemical Formula (3)

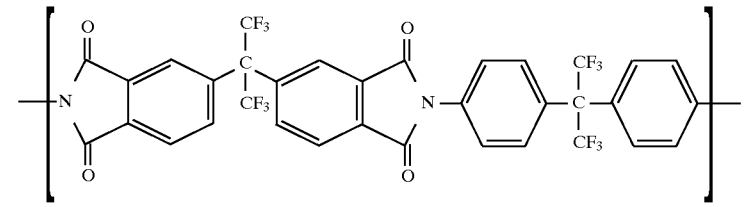

The synthesizing method includes the following procedures of dissolving 0.75 mol of 2.2-bis (4-aminophenyl) hexafluoro propane (BAAF) in 1,842 grams of diethylene glycol dimethyl ether as an organic solvent (A) or (C); adding 0.75 mol of hexafluoro ispropylidine −2,2-bis (phthalic acid anhydride) (6FDA) to the above-mentioned solvent under a nitrogen atmosphere; stirring for eight hours at room temperature and polymerizing so as to obtain polyamic acid; then adding 406 grams of diethylene glycol dimethyl ether thereto; after the solution becomes homogeneous, adding 2.25 mol of pyridine (imide reacting agent) and 2.25 mol of acetic anhydride (imide reacting agent); and stirring for twelve hours at a room temperature to conduct an imide reaction. After the above-mentioned reaction was conducted, the obtained solution was filtered as a film-forming solution, left for deaeration and adjusted. The film-forming solution was cast on a polyester nonwoven cloth to a thickness of approximately 130 μm by means of an applicator at the temperature of 25° C. And it was soaked in water as a solidifying solution at a temperature of 30° C. for 5 minutes and in water at a temperature of 20° C. for one hour, thus forming a semipermeable membrane.

The obtained semipermeable membrane was dried for 20 minutes at a temperature of 60° C. and then removed from the nonwoven cloth and soaked in a 30% ethanol aqueous solution and freeze-broken in liquid nitrogen. The obtained cross section was observed by means of a FE-SEM (HITACHI, S-4000: at the accelerating current of 3 KV).

The obtained FE-SEM picture was entered in a computer by means of a scanner (Canon, IX-4015) and then the picture analysis of it was conducted by means of Mac SCOPE as a picture processing software. The observed structure of the semipermeable membrane of the present invention was shown in FIG. 3(a) and FIG. 3(b), which shows the picture taken by the scanning electron microscope (SEM) having the field emission (FE) electron gun. Moreover, the results of the picture analysis are shown in FIG. 4(a), FIG. 4(b) and Table 1.

Figure 1:
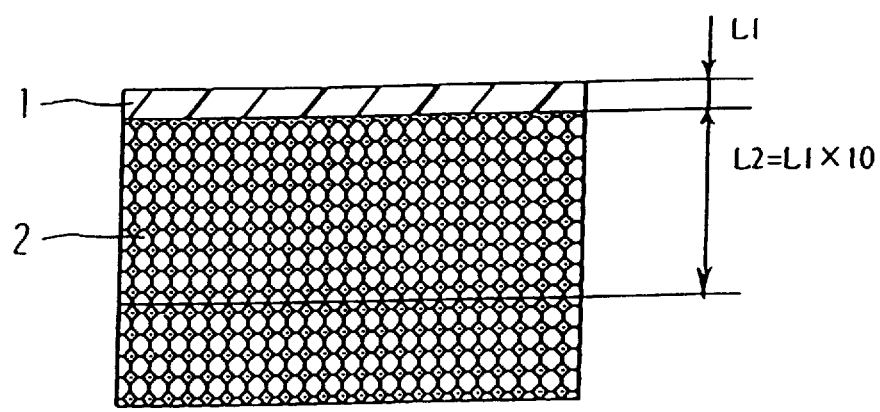
FIG. 1 is a conceptual cross sectional view showing the porous layer part having the thickness of L1×10 (L2) in which L1 represents the thickness of the homogeneous skin layer part of one embodiment of the present invention.
Figure 2:
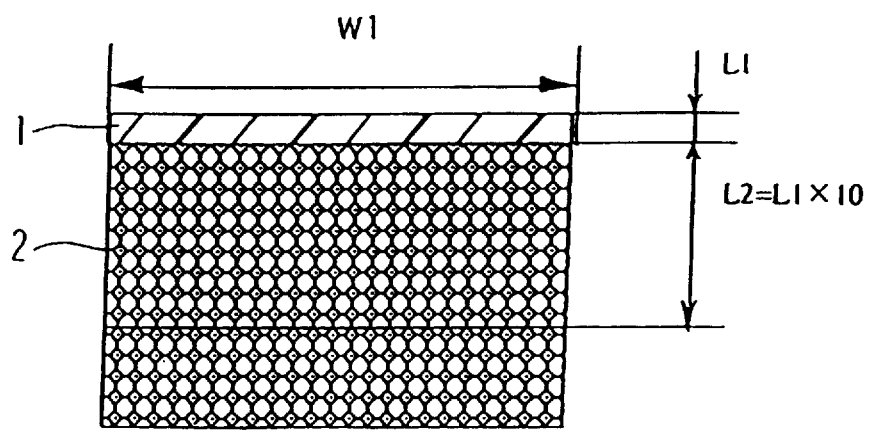
FIG. 2 is a drawing explaining the measurement for numerically evaluating the structure of the semipermeable membrane of one embodiment of the present invention.
Figure 3A:
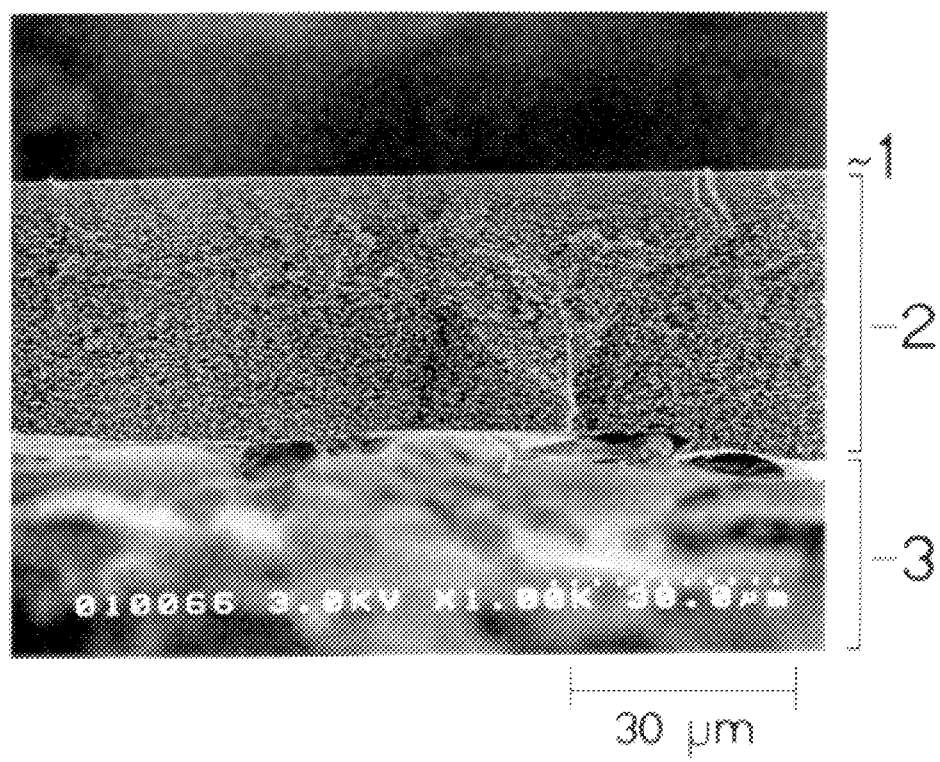
FIG. 3(a) and FIG. 3(b) are microphotographs taken by the scanning electron microscope (SEM) having the field emission (FE) electron gun, showing the structure of the semipermeable membrane of the first embodiment of the present invention.
Figure 3B:
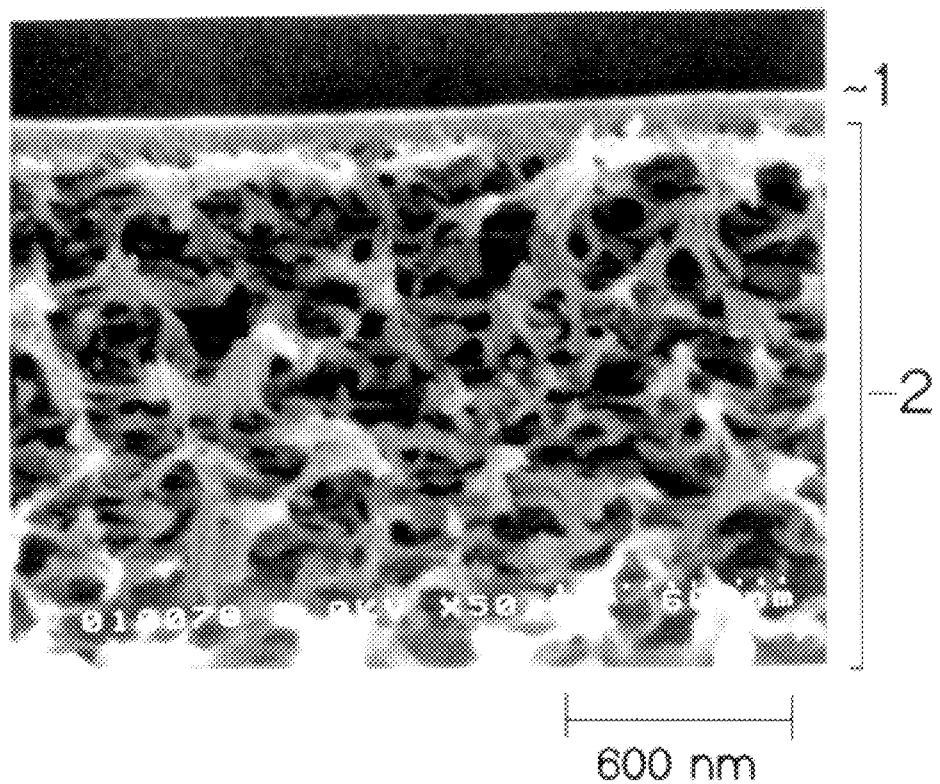
Figure 4A:
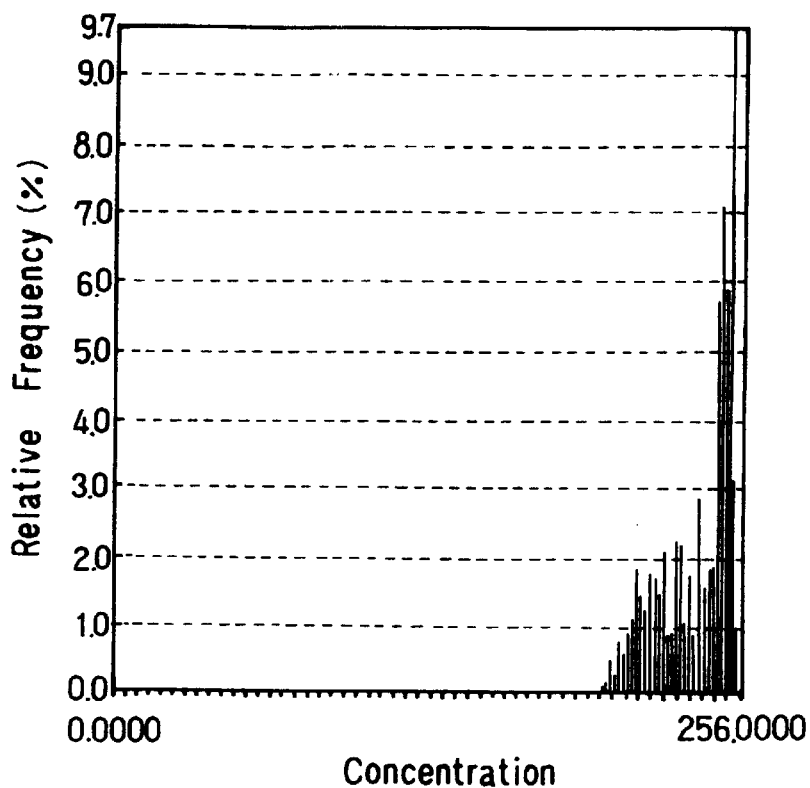
FIG. 4(a) is a histogram of the concentration and result of an analysis when the skin layer part (L1) of the semipermeable membrane of the first embodiment of the present invention is analyzed as a binary picture (at a 256 gradation).
Figure 4B:
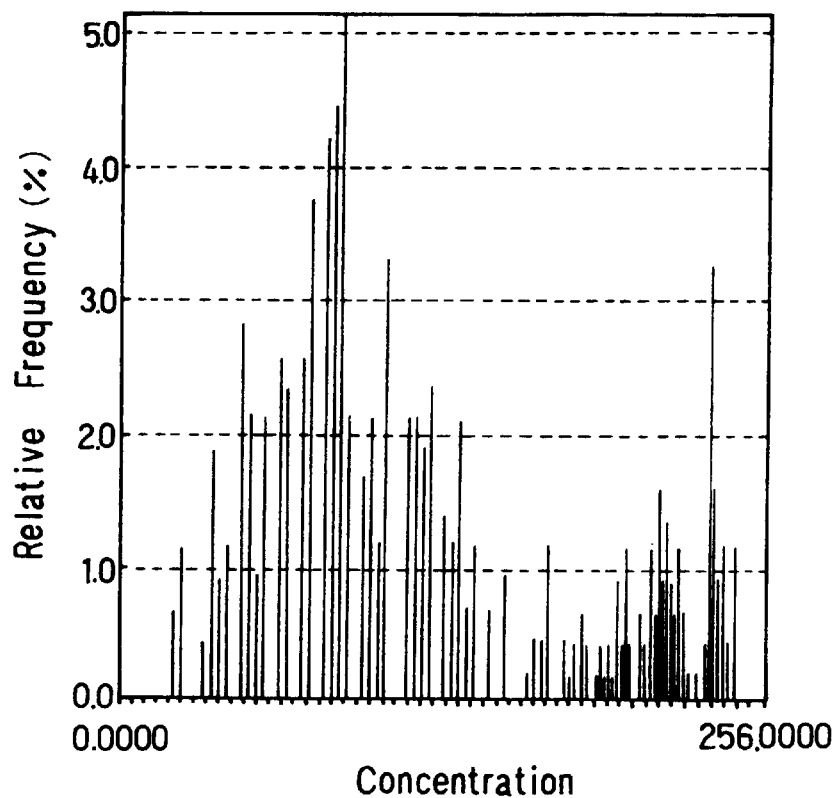
FIG. 4(b) is a histogram of the concentration and result of analysis when the porous part (L1×10) of the semipermeable membrane of the first embodiment of the present invention is analyzed as a binary picture (at 256 gradation).

As shown in FIG. 3(a) and FIG. 3(b), the finger void structure having a diameter of not less than 3 μm in its porous layer was not observed.

Comparative Example 1

The same process as in Example 1 was carried out except that the solution was replaced by NMP. In addition, the observation was carried out by means of the FE-SEM (HITACHI, S-4500; at the accelerating current of 1 KV).

Figure 5A:
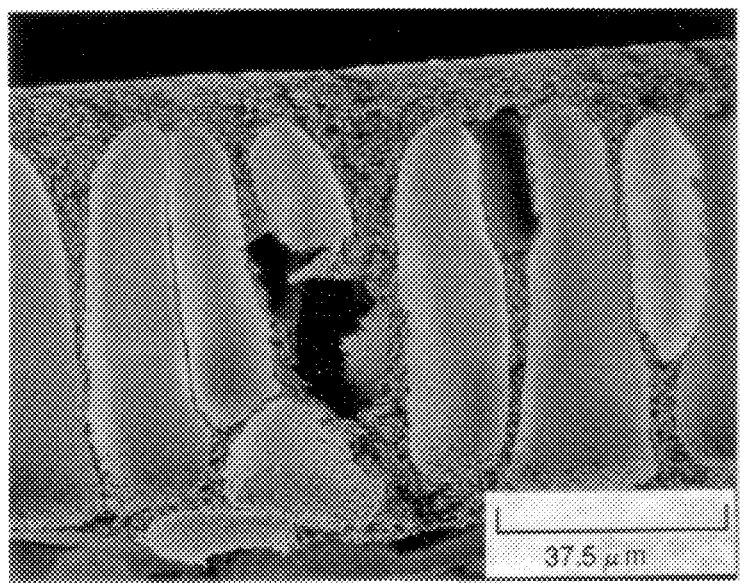
FIGS. 5(a) and 5(b) are microphotographs taken by the scanning electron microscope (SEM) having the field emission (FE) electron gun, showing the structure of the semipermeable membrane of the first comparative example of the present invention.
Figure 5B:
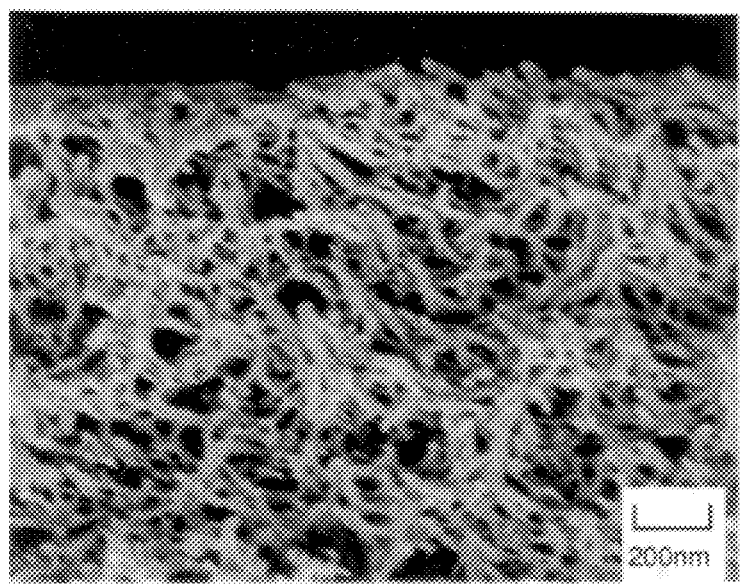
Figure 6A:
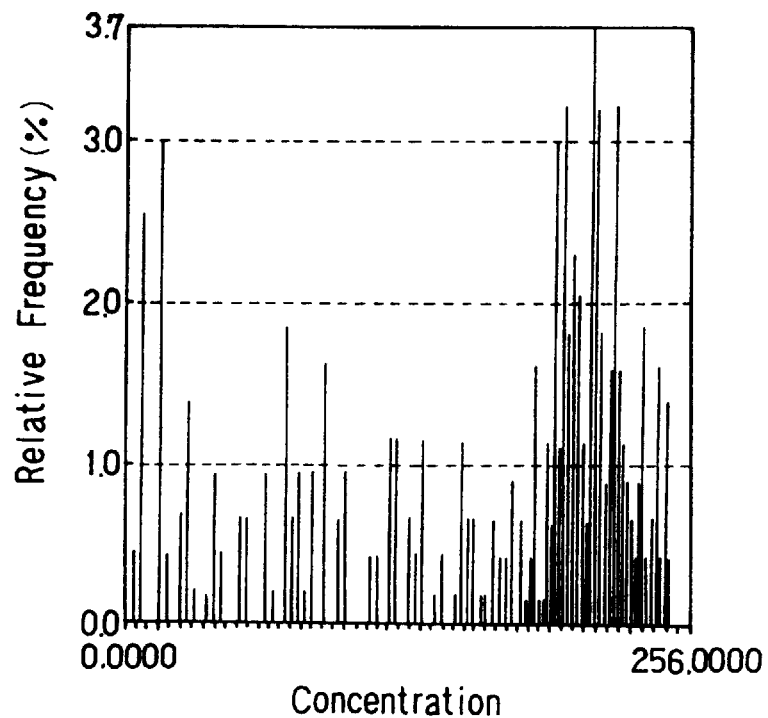
FIG. 6(a) is a histogram of the concentration and result of analysis when the skin layer portion (10 nm of most outer layer (L1)) of the semipermeable membrane of the first comparative example of the present invention is analyzed as a binary picture (at a 256 gradation).
Figure 6B:
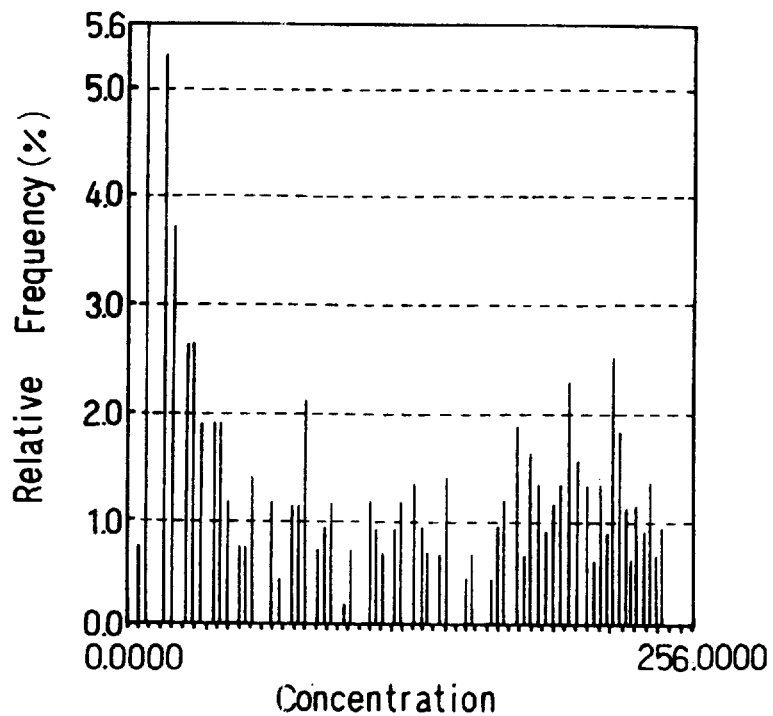
FIG. 6(b) is a histogram of the concentration and the result of analysis when the porous part (L1×10) of the semipermeable membrane of the first embodiment of the present invention is analyzed as a binary picture (at a 256 gradation).
Figure 7:
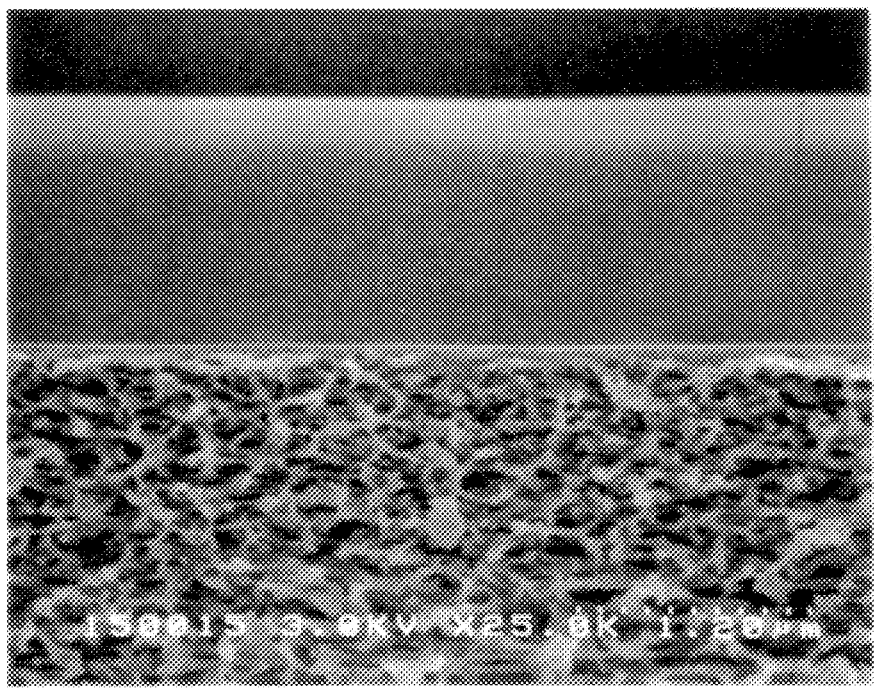
FIG. 7 is a microphotograph taken by the scanning electron microscope (SEM) having the field emission (FE) electron gun, showing the structure of the semipermeable membrane of the second embodiment of the present invention.

The pictures taken by the FE-SEM were shown in FIG. 5(a) and FIG. 5(b). The results of the picture analysis are shown in FIG. 6(a), FIG. 6(b) and Table 1.

TABLE 1

|  | Example 1 | Comparative Example 1 |
|---|---|---|
| Average Thickness of Skin Layer (L1) | 50 nm | not observed |
| Average Brightness of Skin Layer | 238.4 | 170.3 suppose outer surface has thickness of 10 nm |
| Standard Deviation of Brightness of Skin Layer | 13.3 | 69.6 |
| Average Brightness of Porous Layer (L2) | 130.9 | 131.6 |
| Opening Ratio of Porous Layer (threshold value:131) | 60% | 38.9% |
| Average Brightness of Skin Layer/Average Brightness of Porous Layer | 1.8 | 1.3 |

As shown in FIG. 5(a), the finger void structure having the diameter of not less than 3 μm in its porous layer was observed. Moreover, as shown in FIG. 5(b), the finger void structure having a diameter of not less than 3 μm was observed and the skin layer was not observed at the interface.

EXAMPLE 2

The crosslinking silicone resin solution (hexane solution of RTV of GE Silicones having the concentration of 3 wt. %) as an elastomer polymerizer was coated onto the surface of the semipermeable membrane that was obtained in Example 1. Then heat treatment was conducted for 15 minutes at a temperature of 110° C. so as to form and laminate a membrane of elastomer polymerizer. The picture taken by the FE-SEM is shown in FIG. 5.

As stated above, the present invention can provide the polyimide resin semipermeable membrane forming the continuous structure of homogeneous skin layer part having an average thickness of 5–1000 nm and the porous layer that is made of the same materials and has the same thickness as the skin layer. The porous layer is formed by the void structure having an average diameter of less than 3 μm so that a gas separation membrane which has the high permeability and satisfies the cost efficiency. In addition, this invention permits manufacturing the semipermeable membranes on an industrial level and obtaining the film structure of the membrane that conducts the separating operation efficiently.

More specifically, the semipermeable membrane of the present invention has a sufficient strength by providing the structure comprising the homogeneous thin film skin layer having the thickness of not more than the predetermined value and the porous layer that is made of the same materials as the skin layer. In addition, the interface between the skin layer and the porous layer is clear and the hole diameter of the porous part is large so that the semipermeable membrane has high permeability and high separation properties. Furthermore, the above-mentioned semipermeable membrane of the present invention permits an efficient operation.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A polyimide resin semipermeable membrane forming a continuous structure comprising a homogeneous skin layer part having an average thickness of 5–1000 nm and a porous layer in contact with the skin layer part that is made of a same material as said skin layer part and thicker than said skin layer part, wherein said porous layer is formed by a void structure having an average hole diameter of less than 3 μm, and which forms relatively uniform pores in a part of the porous layer that is in contact with the skil layer part and has a thickness L2 of at least L1×10, where L1 is the thickness of the skin layer part.

2. The polyimide semipermeable membrane according to claim 1, wherein at least 70% of said porous layer part is an open part and a rectangle circumscribing a pore of said open part has dimensions Ly in length and Lx in width and Lx and Ly are in the following ranges: 10 nm≦Lx≦1000 nm and 10 nm≦Ly≦1000 nm.

3. The polyimide semipermeable membrane according to claim 1, wherein the skin layer part has an average brightness of not less than 100 and a standard deviation of not more than 50 at a 256 gradation when the skin layer part having the thickness of L1 is observed by means of a scanning electron microscope having field emission electron gun at ×50,000 magnification and pictured as a binary picture at a monochrome 256 gradation.

4. The polyimide semipermeable membrane according to claim 1, wherein a hole part of a pictured part of the porous layer observed by picture analysis, which exhibits a condition below an average boundary value at 256 gradation, accounts for not less than 40% with respect to a whole pictured part in a population ratio, when said porous layer part observed by means of a scanning electron microscope having a field emission electron gun at ×50,000 magnification and pictured as a binary picture at a monochrome 256 gradation.

5. The polyimide semipermeable membrane according to claim 1, wherein an average brightness ratio of L1 to L2 is not less than 1.5, when the skin layer part having the thickness of L1 and the porous layer part having the thickness of L2 are observed by means of a scanning electron microscope having a field emission electron gun at ×50,000 magnification and pictured as a binary picture at monochrome 256 gradation.

6. The polyimide semipermeable membrane according to claim 1 further comprising an elastomer polymer overcoat formed on the skin layer part of the polyimide semipermeable membrane.

7. The polyimide semipermeable membrane according to claim 6, wherein the elastomer polymer overcoat comprises a crosslinked silicone resin.

8. The polyimide semipermeable membrane according to claim 1, wherein the skin layer part and the porous layer are made of the same fluorine-containing polyimide.

\* \* \* \* \*